United States Patent
Olsson et al.

(10) Patent No.: US 12,156,025 B2
(45) Date of Patent: Nov. 26, 2024

(54) RADIO NETWORK NODE, NETWORK NODE AND METHODS FOR SETTING UP A SECURE CONNECTION TO THE USER EQUIPMENT (UE)

(71) Applicant: Telefonaktiebolaget LM Ericsson (publ), Stockholm (SE)

(72) Inventors: Lars-Bertil Olsson, Angered (SE); Josefin Karlsson, Torslanda (SE); Christer Gustafsson, Huddinge (SE); Peter Ramle, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 199 days.

(21) Appl. No.: 17/295,269

(22) PCT Filed: Nov. 15, 2019

(86) PCT No.: PCT/SE2019/051161
§ 371 (c)(1),
(2) Date: May 19, 2021

(87) PCT Pub. No.: WO2020/106204
PCT Pub. Date: May 28, 2020

(65) Prior Publication Data
US 2022/0007183 A1  Jan. 6, 2022

Related U.S. Application Data

(60) Provisional application No. 62/769,022, filed on Nov. 19, 2018.

(51) Int. Cl.
*H04W 12/0431* (2021.01)
*H04L 1/1607* (2023.01)
*H04W 12/106* (2021.01)

(52) U.S. Cl.
CPC ....... *H04W 12/0431* (2021.01); *H04L 1/1664* (2013.01); *H04W 12/106* (2021.01)

(58) Field of Classification Search
CPC .................. H04W 12/0431; H04W 12/106
See application file for complete search history.

(56) References Cited

U.S. PATENT DOCUMENTS 8,422,448 B2 * 4/2013 Chu ...................... H04W 76/10
370/328
8,917,661 B2 * 12/2014 Hsu ................. H04W 36/00835
370/328

(Continued)

FOREIGN PATENT DOCUMENTS

EP       2509345 A1   10/2012
WO   2018174995 A1    9/2018

OTHER PUBLICATIONS

Alcatel-Lucent, et al., "S2-124905: UE capabilities in the UE Radio Capability Match Request procedure," 3GPP SA WG2 Meeting #94, Nov. 12-16, 2012, New Orleans, Louisiana, 5 pages.

(Continued)

*Primary Examiner* — Viral S Lakhia
(74) *Attorney, Agent, or Firm* — Withrow & Terranova, PLLC

(57) ABSTRACT

Embodiments herein relate to e.g. a method performed by a network node for handling a communication of a user equipment, UE, in a wireless communication network. The network node transmits to a radio network node associated with the UE, a request message indicating a request for capability data for the UE, wherein the request message comprises a security indication, and wherein the security indication indicates data for setting up a secure connection to the UE.

7 Claims, 13 Drawing Sheets

(56) References Cited

U.S. PATENT DOCUMENTS

| | | | |
|---|---|---|---|
| 9,276,743 | B2* | 3/2016 | Cordeiro De Oliveira Barros ..... H04L 9/14 |
| 9,826,398 | B2* | 11/2017 | Chen ........................ H04L 63/06 |
| 9,860,220 | B2* | 1/2018 | Gamer ................. H04W 12/041 |
| 9,986,432 | B2* | 5/2018 | Fransen ................... G06F 16/22 |
| 10,292,040 | B2* | 5/2019 | Dubesset .............. H04W 12/06 |
| 10,630,661 | B2* | 4/2020 | Lee ........................ H04W 12/06 |
| 11,304,157 | B2* | 4/2022 | Davydov ............ H04L 27/2613 |
| 11,317,401 | B2* | 4/2022 | Lee ........................ H04W 72/23 |
| 11,540,172 | B2* | 12/2022 | Zhu ........................ H04W 28/08 |
| 11,553,348 | B2* | 1/2023 | Wang ................... H04W 12/122 |
| 11,582,231 | B2* | 2/2023 | Targali ................... H04W 12/06 |
| 2015/0289138 | A1* | 10/2015 | Wang .................... H04W 12/08 455/411 |
| 2016/0219437 | A1* | 7/2016 | Suh ....................... H04W 12/06 |
| 2017/0202033 | A1* | 7/2017 | Lee ..................... H04W 12/037 |
| 2018/0167854 | A1* | 6/2018 | Enomoto .......... H04W 36/0061 |
| 2018/0270666 | A1* | 9/2018 | Lee ...................... H04W 12/084 |
| 2018/0301222 | A1* | 10/2018 | Dew, Sr. ................. G16H 15/00 |
| 2019/0098487 | A1* | 3/2019 | Boettger ............... H04W 8/183 |
| 2020/0187088 | A1* | 6/2020 | Chun .................... H04W 48/02 |
| 2021/0092668 | A1* | 3/2021 | Zaus ...................... H04W 60/00 |
| 2021/0185539 | A1* | 6/2021 | Quinquis ................ H04W 4/80 |

OTHER PUBLICATIONS

CATT, et al., "S2-2002442: UE capability match request during the registration procedure," 3GPP SA WG2 Meeting #137E, Feb. 24-27, 2020, E-meeting, 2 pages.

Nokia, et al., "S2-178664: 23.502: OI#21: AS security context setup," 3GPP SA WG2 Meeting #124, Nov. 27-Dec. 1, 2017, Reno, Nevada, 14 pages.

Nokia, et al., "S2-179302: 23.502: OI#21: AS security context setup," 3GPP SA WG2 Meeeting #124, Nov. 27-Dec. 1, 2017, Reno, Nevada, 13 pages.

Nokia, et al., "S2-183243: Signalling only connection—AS security context," 3GPP SA WG2 Meeting #127, Apr. 16-20, 2018, Sanya, China, 3 pages.

Extended European Search Report for European Patent Application No. 19887889.4, mailed Aug. 8, 2022, 9 pages.

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.5.0, 3GPP Organizational Partners, Sep. 2018, 410 pages.

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.0.0, 3GPP Organizational Partners, Sep. 2018, 410 pages.

Author Unknown, "Technical Specification Group Services and System Aspects; System Architecture for the 5G System; Stage 2 (Release 15)," Technical Specification 23.501, Version 15.3.0, 3GPP Organizational Partners, Sep. 2018, 226 pages.

Author Unknown, "Technical Specification Group Services and System Aspects; Procedures for the 5G System; Stage 2 (Release 15)," Technical Specification 23.502, Version 15.0.0, 3GPP Organizational Partners, Dec. 2017, 258 pages.

Author Unknown, "Technical Specification Group Services and System Aspects; Procedures for the 5G System; Stage 2 (Release 15)," Technical Specification 23.502, Version 15.3.0, 3GPP Organizational Partners, Sep. 2018, 330 pages.

Author Unknown, "Technical Specification Group Services and System Aspects; 3GPP System Architecture Evolution (SAE); Security architecture (Release 15)," Technical Specification 33.401, Version 15.5.0, 3GPP Organizational Partners, Sep. 2018, 163 pages.

Author Unknown, "Technical Specification Group Services and System Aspects; Security architecture and procedures for the 5G system (Release 15)," Technical Specification 33.501, Version 15.2.0, 3GPP Organizational Partners, Sep. 2018, 175 pages.

Author Unknown, "Technical Specification Group Radio Access Network; Evolved Universal Terrestrial Radio Access Network (E-UTRAN); S1 Application Protocol (S1AP) (Release 15)," Technical Specification 36.413, Version 15.3.0, 3GPP Organizational Partners, Sep. 2018, 383 pages.

Author Unknown, "Technical Specification Group Radio Access Network; NG-RAN; NG Application Protocol (NGAP) (Release 15)," Technical Specification 38.413, Version 15.1.0, 3GPP Organizational Partners, Sep. 2018, 295 pages.

International Search Report and Written Opinion for International Patent Application No. PCT/SE2019/051161, mailed Feb. 13, 2020, 11 pages.

* cited by examiner

RADIO NETWORK NODE, NETWORK NODE AND METHODS FOR SETTING UP A SECURE CONNECTION TO THE USER EQUIPMENT (UE)

This application is a 35 U.S.C. § 371 national phase filing of International Application No. PCT/SE2019/051161, filed Nov. 15, 2019, which claims the benefit of U.S. Provisional Application No. 62/769,022, filed Nov. 19, 2018, the disclosures of which are incorporated herein by reference in their entireties.

TECHNICAL FIELD

Embodiments herein relate to a network node, a radio network node and methods performed therein for communication. Furthermore, a computer program product and a computer readable storage medium are also provided herein. In particular, embodiments herein relate to communicating within a wireless communication network.

BACKGROUND

In a typical wireless communication network, User equipments (UE), also known as wireless communication devices, mobile stations, stations (STA) and/or wireless devices, communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB", or a gNodeB. A service area or cell area is a geographical area where radio coverage is provided by the radio network node. The radio network node communicates over an air interface operating on radio frequencies with the UE within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network also known as new radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

UEs of 5G may be voice centric devices and similar to Voice over LTE (VoLTE) UEs, the UEs may require receiving an IP Multimedia Subsystem (IMS) Voice over Packet Switched Support Indication from the core network to camp on 5G NR and/or 5G core network (5GC). This is the model that is standardized and deployed for VoLTE and also applicable to 5G UEs per 3GPP specifications. Such UE not receiving the mentioned indication would not camp on 5G and reselect to another radio access technology (RAT) e.g. LTE. Packet Switched herein meaning that the voice audio is converted into small units of data called packets, which are routed through a network based on the destination address contained within each packet.

Voice over 5G (NR/5GC) may be provided natively or via EPS fallback procedures where during the quality of service (QoS) flow resource reservation, the UE handling will be transferred, e.g. using inter radio access technology (IRAT) handover (HO) i.e. handover between different radio access technologies (RAT), to EPS. This is further described in 23.502, section 4.13.6.1 'EPS fallback for IMS voice' v. 15.0.0.

In case Voice over 5G is not supported natively in 5G, i.e. Voice over New Radio (VoNR), then EPS Fallback may be used, i.e. use LTE. But to be able to use EPS Fallback requires that the radio capabilities of UEs match the radio characteristics of the potential EPS network to which the UE may be transferred at EPS Fallback. Without knowledge about the UE radio capability match towards the EPS fallback networks, the core network will not be able to correctly set the Voice over packet switched (PS) supported indication to Supported or Not Supported towards the UE in a Registration Accept message.

FIG. 1 is a schematic overview depicting a signalling scheme according to the standardized solution of a network node such as an Access and Mobility Management Function (AMF) node. After initiating a registrations procedure for the UE, the AMF node transmits a capability request to the RAN node. The RAN node fetches capability of the UE and determines a capability of the RAN. The RAN node further transmits a capability response to the AMF node. This capability response may comprise a voice support match indicator. The AMF node may then transmit initial context setup request comprising a voice support indicator. The RAN node may then transmit an initial context setup response back to the AMF node. Hence, 3GPP has standardized a procedure called "UE Radio Capability Match" procedure as per 3GPP TS 23.502, section 4.2.8a. FIG. 2 shows in more detail the procedure wherein use of that procedure the AMF node may receive an "Voice Support Match Indicator" from RAN. At initiation of this procedure the AMF node may or may not provide the UE Radio capability information element (IE) to the RAN but if not provided then RAN is supposed to fetch the UE Radio capability from the UE over radio resource control (RRC) signalling.

SUMMARY

In case the network node such as an AMF node does not have the UE Radio Capability information, RAN is supposed to fetch it from the UE over RRC but, according to the current standard, the RRC 'UE capability Enquiry' and RRC 'UE capability Enquiry Information' messages would need to be sent unprotected over access stratum and is not preferable. An alternative could be to not include the non-access stratum (NAS) 'Registration Accept' message in the 'Initial Context Setup' procedure but instead provide it to the UE in a 'Downlink NAS transfer' message after conclusion of the 'Initial Context Setup' procedure. The drawback is that this causes extra latency and signalling resulting in a limited or reduced performance of the wireless communication network.

An object of embodiments herein is to provide a mechanism for improving performance of the wireless communication network in an efficient manner.

According to an aspect the object may be achieved by a method performed by a network node for handling communication of a UE in a wireless communication network. The network node transmits to a radio network node associated with the UE, a request message indicating a request for capability data for the UE, wherein the request message comprises a security indication, and wherein the security indication indicates data for setting up a secure connection to the UE. The network node may request capability data wherein capability data may be data indicating whether the UE and/or the radio network node is capable to support voice over packet switched communication.

According to another aspect the object may be achieved by a method performed by a radio network node for handling communication of a UE in a wireless communication network. The radio network node receives from a network node, a request message indicating a request for capability data for the UE, wherein the request message comprises a security indication, and wherein the security indication indicates data for setting up a secure connection to the UE. The radio network node further sets up a secure connection to the UE using the security indication.

According to yet another aspect the object may be achieved by providing a network node for handling a communication of a UE in a wireless communication network. The network node is configured to transmit to a radio network node associated with the UE, a request message indicating a request for capability data for the UE, wherein the request message comprises a security indication, and wherein the security indication indicates data for setting up a secure connection to the UE.

According to still another aspect the object may be achieved by providing a radio network node for handling a communication of a UE in a wireless communication network. The radio network node is configured to receive from a network node, a request message indicating a request for capability data for the UE, wherein the request message comprises a security indication, and wherein the security indication indicates data for setting up a secure connection to the UE. The radio network node is further configured to set up a secure connection to the UE using the security indication.

It is furthermore provided herein a computer program product comprising instructions, which, when executed on at least one processor, cause the at least one processor to carry out any of the methods above, as performed by the network node or the radio network node. It is additionally provided herein a computer-readable storage medium, having stored thereon a computer program product comprising instructions which, when executed on at least one processor, cause the at least one processor to carry out the method according to any of the methods above, as performed by the network node or the radio network node.

In case the network node such as an AMF node or an MME is not able to, in the request message such as a 'UE Radio Capability Match Request' message, provide the UE Radio Capability information to the radio network node, thereby requiring the radio network node to fetch this information over access stratum (AS), the network node instead provides a security indication such as AS Security keys to RAN in e.g. the 'UE Radio Capability Match request' message. By that the radio network node will be able to fetch the UE Radio Capability information from the UE over AS without the need to use unprotected signalling over AS. The solution is also applicable for LTE upon retrieval of UE radio capability using UE Radio Capability Match procedure by MME and eNB. Note, however, AS Security may be established when the UE and the network node first establish NAS security.

Embodiments herein thus enable the radio network node to fetch the capability information in an efficient and secure manner leading to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
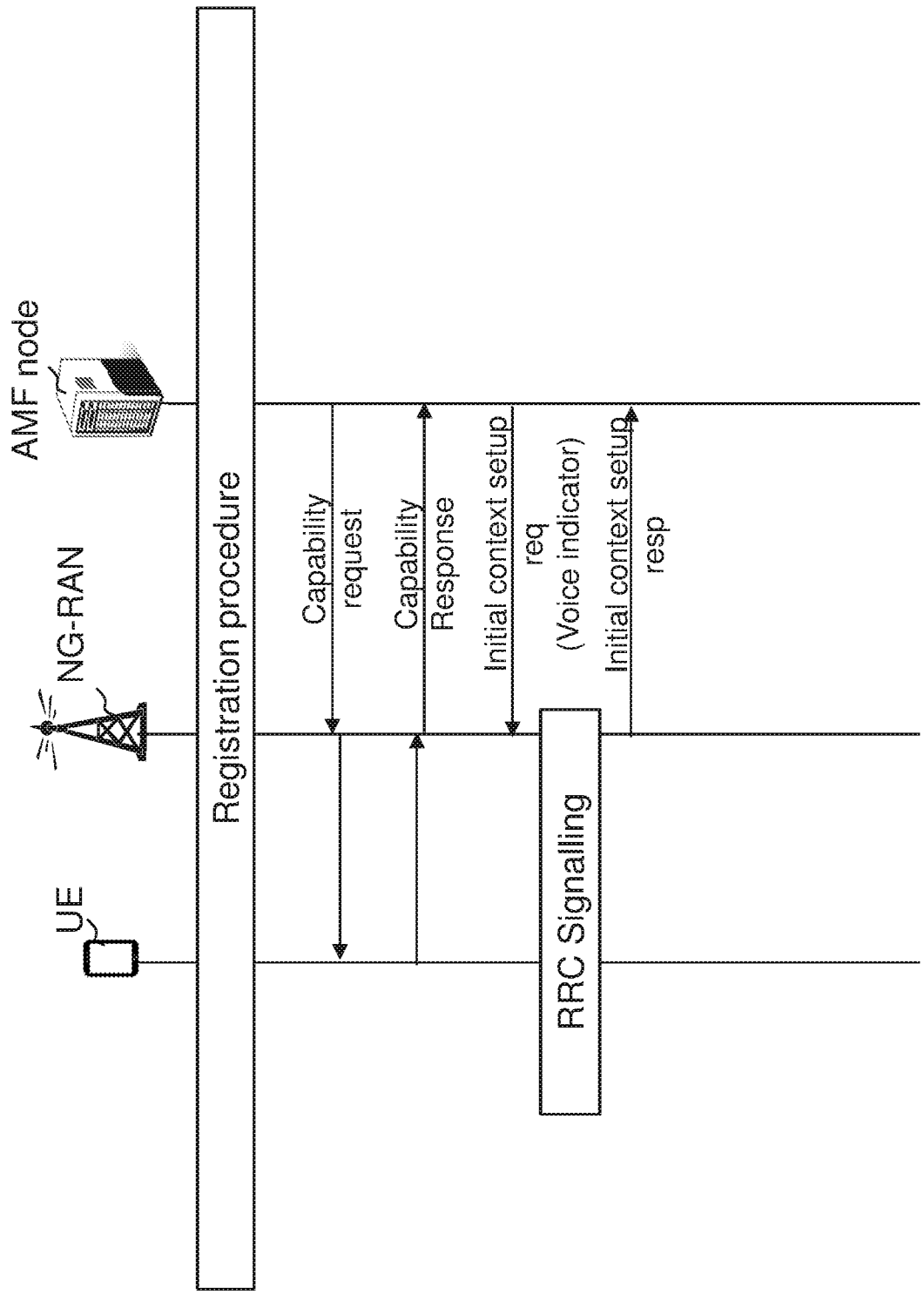
FIG. 1 is capability retrieval according to prior art.
Figure 2:
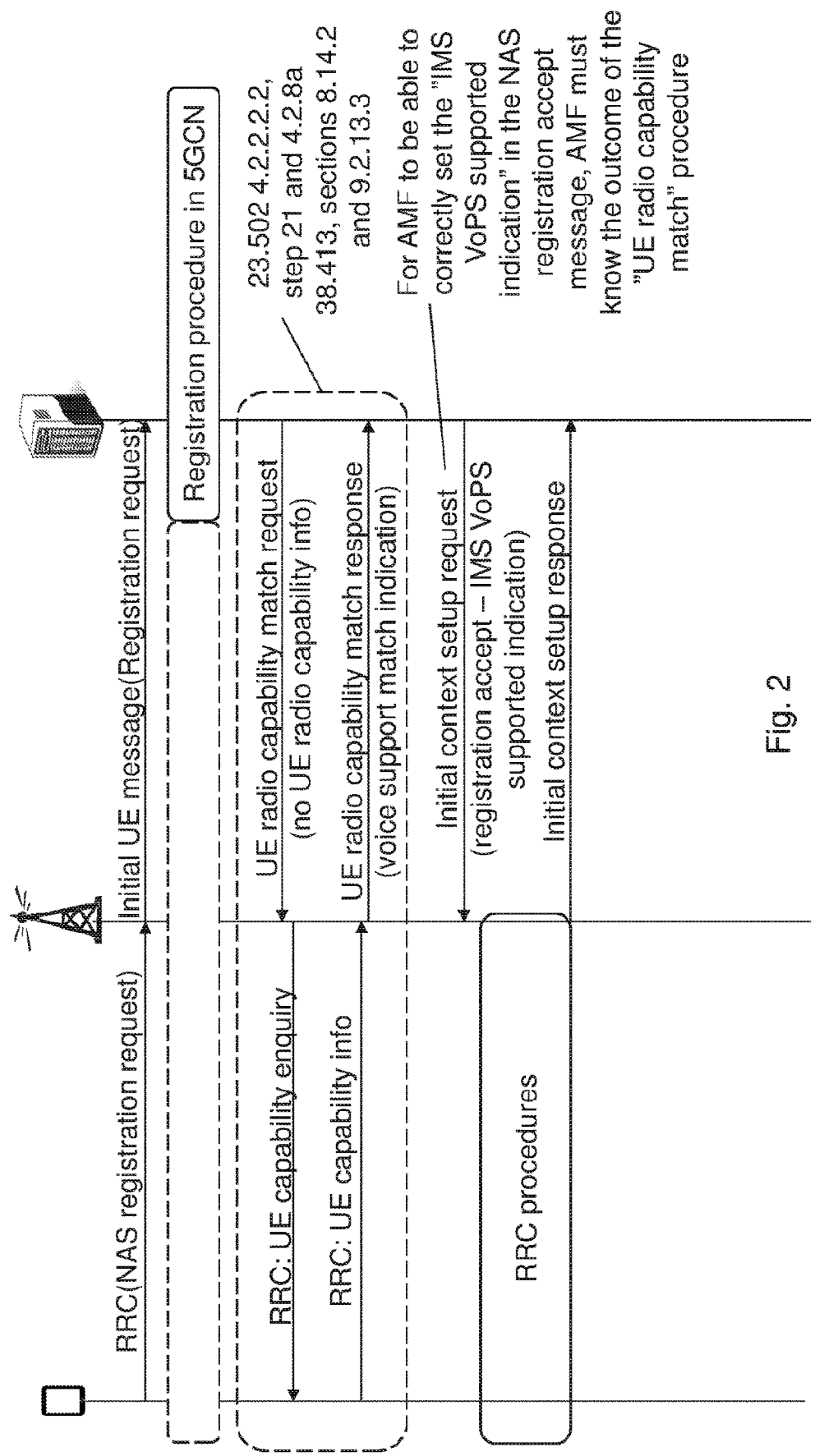
FIG. 2 is capability retrieval according to prior art.
Figure 3:
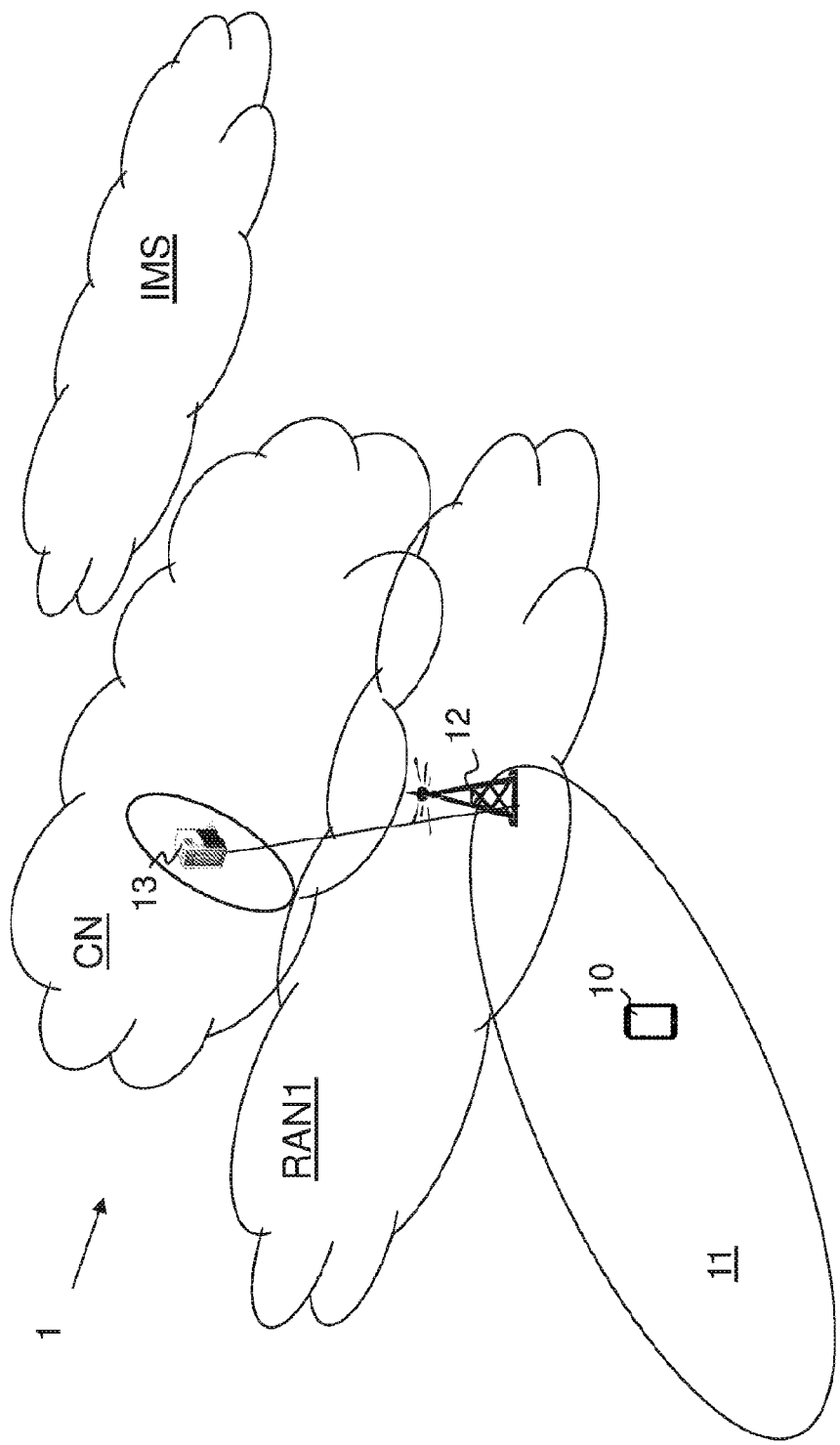
FIG. 3 is a schematic overview depicting a communication network according to embodiments herein.

Embodiments herein relate to communication networks in general. FIG. 3 is a schematic overview depicting a communication network 1. The communication network 1 comprises one or more RANs e.g. a first RAN (RAN1), connected to one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, UEs e.g. a UE 10 such as a mobile station, a non-access point (non-AP) STA, a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device, Internet of Things operable device, Device to Device (D2D) terminal, mobile device e.g. smart phone, laptop, mobile phone, sensor, relay, mobile tablets or any device communicating within a cell or service area.

The communication network 1 comprises a radio network node 12 providing radio coverage over a geographical area, a service area 11 or a cell, of a first radio access technology (RAT), such as New Radio (NR), LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the service area served by the radio network node 12 depending e.g. on the first radio access technology and terminology used.

The communication network 1 further comprises a network node 13 such as a RAN node and/or a core network node e.g. Radio Software Defined Networking (SDN) node, an AMF node, an MME, a serving gateway (S-GW), a Serving GPRS Support Nodes (SGSN) node, or corresponding node in e.g. a 5G network or similar. The abbreviation "GPRS" denotes General Packet Radio Services.

In case the network node 13 is not being able to provide, e.g. in a 'UE Radio Capability Match Request' message, Capability information of the UE to the radio network node 12 and thereby requiring the radio network node 12 to fetch this information over AS, the network node 13 transmits security information referred herein as security indication such as security keys, for communicating securely with the UE 10, in e.g. a capability match request message. By that the radio network node 12 is be able to fetch the UE Radio Capability information from the UE 10 over the access stratum (AS) or radio interface in a secure manner without the need to use unprotected signalling over the AS. The radio network node 12 thus receives, from the network node 13, the security indication such as one or more security keys, for communicating securely with the UE 10, in the capability match request message. The radio network node 12 then fetches capability information of the UE 10 from the UE signalling over AS using the security indication. Embodiments herein improve the security of signalling before e.g. an Initial UE Context Setup procedure, by enabling the radio network node 12 to request UE capability information from the UE in a protected mode. This may also provide an opportunity to reduce the amount of signalling and latency at registration request by the UE 10.

Figure 4:
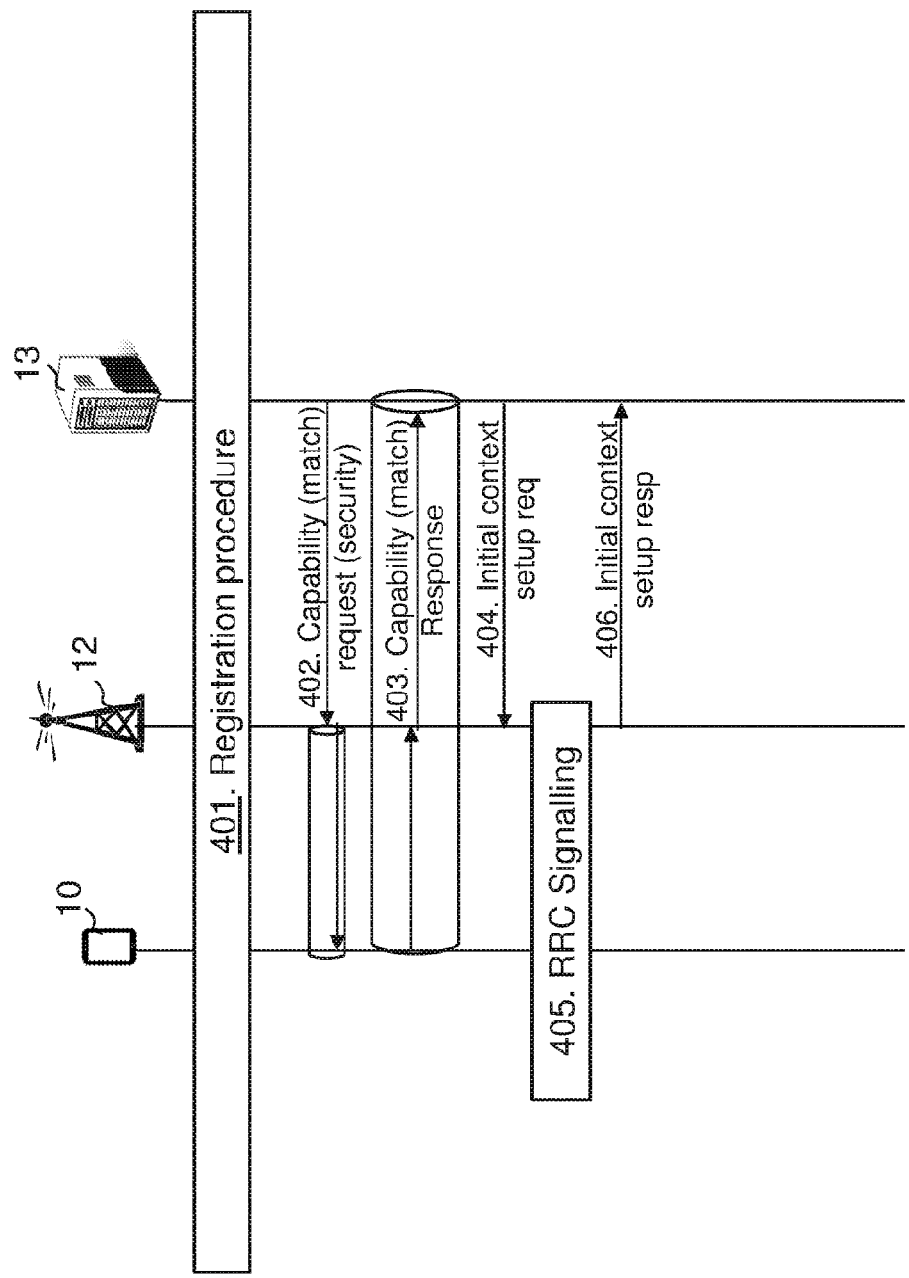
FIG. 4 is a combined flowchart and signalling scheme according to embodiments herein.

FIG. 4 is a combined signalling scheme and flowchart according to embodiments herein.

Action 401. A registration procedure is initiated and performed for the UE 10. The UE 10 and the network node 13 may herein first establish NAS security. For example, in this action 401 the network node 13 may be provided by the UE 10 as part of a first NAS message with a reference to a current security context to which the network node 13 has access. The network node may then use the security context indicated by the UE 10 to derive keys for the radio network node 12 to use. In case the information provided by the UE 10 as part of the first NAS message either does not include a valid reference to a security context, or, includes a reference to a security context which the network node 13 is unable to use, the network node may first perform NAS Authentication and Security Mode Control procedures to establish a new security context. When that is accomplished the network node 13 may continue as above and derive one or more security keys for the radio network node 12 to use. The first NAS message may be a Registration Request at executing the registration procedure.

Action 402. The network node 13 transmits a request message indicating a request for capability data for the UE 10. The request message comprises the security indication, and wherein the security indication indicates data for setting up the secure connection to the UE 10. The capability data may be capability to support voice over packet switched communication and thus the request message may request for voice match and if the network node 13 doesn't include UE Radio capability data then it is also indirectly a request for that. If not including UE Radio capability data then as a consequence the radio network node 12 need to fetch radio capability data from the UE 10. The network node 13 may piggyback the security indication to a UE radio capability match request. Piggyback meaning using already existing and/or included information elements in the message or adding an information element to the message.

Action 403. The radio network node 12 uses the security indication to set up a secure connection, e.g. an AS secured connection, to the UE 10 and the radio network node 12 may retrieve capability data for the UE 10 such as context of the UE 10 from the UE in a secure manner. Furthermore, the radio network node 12 provides the retrieved capability data e.g. UE context info to the requesting network node 13 in e.g. a voice match response or similar.

Action 404. The network node 13 may then transmit an initial context setup request, which is used to convey a NAS message Registration Accept where the NAS message includes an indication calculated based on the information retrieved by Action 403.

Action 405. RRC signalling is performed between entities in the wireless communication network.

Action 406. The radio network node 12 may then transmit an initial context setup response.

Figure 5:
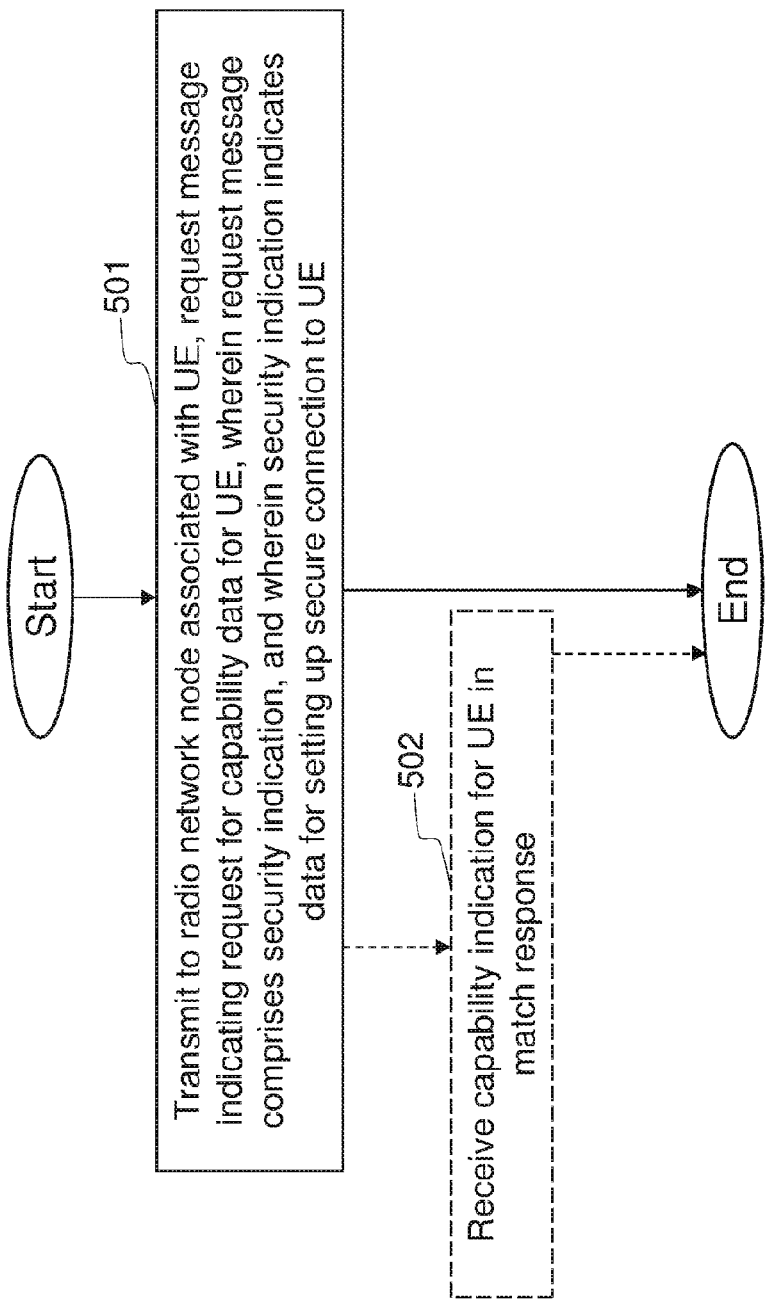
FIG. 5 is a schematic flowchart depicting a method performed by a network node according to embodiments herein.

The method actions performed by the network node for handling communication of a user equipment, UE, in a wireless communication network 1 according to embodiments will now be described with reference to a flowchart depicted in FIG. 5. Actions performed in some embodiments are marked with dashed boxes.

Action 501. The network node 13 transmits to the radio network node 12 associated with the UE 10, a request message indicating a request for capability data for the UE 10. The request message comprises the security indication, and the security indication indicates data for setting up the secure connection to the UE 10. The security indication may comprise one or more security keys and/or UE Security Capability, and the request message may be a UE Capability check request message. The security indication may be piggybacked to the request message. The request message may be a match request such as a UE radio capability check request or a UE radio capability match request requesting a response indicating whether voice over packet switched is supported or not by the UE 10 and/or the radio network node 12.

Action 502. The network node 13 may receive a capability indication, e.g. indicating whether the UE and/or the radio network node support voice over packet switched communication or not, for the UE 10 in a match response, wherein the capability indication indicates a capability of the UE 10. The match response may be a voice match response from the radio network node 12 indicating whether voice over packet switched is supported or not by the UE 10 and/or the radio network node 12. The match response may be a UE radio capability match response.

Figure 6:
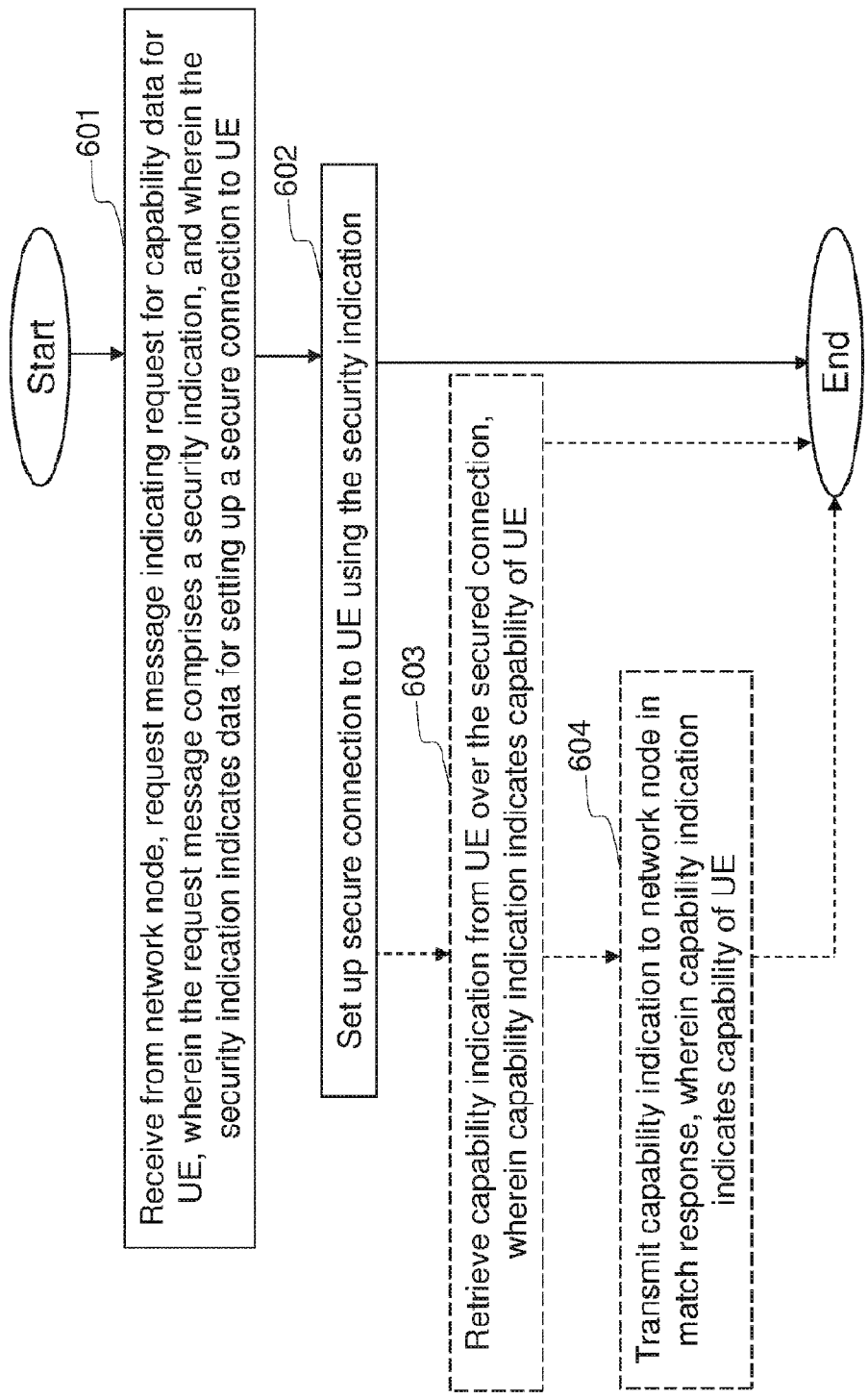
FIG. 6 is a schematic flowchart depicting a method performed by a radio network node according to embodiments herein.

The method actions performed by the radio network node 12 for handling communication of the UE 10 in the wireless communication network 1 according to embodiments will now be described with reference to a flowchart depicted in FIG. 6. The actions do not have to be taken in the order stated below, but may be taken in any suitable order. Actions performed in some embodiments are marked with dashed boxes.

Action 601. The radio network node 12 receives from the network node 13, the request message indicating the request for capability data for the UE 10, wherein the request message comprises the security indication. The security indication indicates data for setting up the secure connection to the UE 10. The security indication may comprise one or more security keys and/or UE Security Capability, and wherein the request message is a UE Capability check request message. The security indication may be piggybacked to the request message.

Action 602. The radio network node 12 further sets up a secure connection to the UE 10 using the security indication. The radio network node 12 may thus use security keys and/or UE Security Capability to set up the secure connection over AS or NAS. This may be triggered in the case that the received request message lacks capability information of the UE 10.

Action 603. The radio network node 12 may retrieve a capability indication from the UE 10 over the secured connection, wherein the capability indication indicates capability of the UE 10.

Action 604. The radio network node 12 may then transmit the capability indication to the network node 13 in a match response, wherein the capability indication indicates a capability of the UE 10. The capability may be voice support thus the match response may be a voice match response from the radio network node 12 indicating whether voice over packet switched is supported or not by the UE 10 and/or the radio network node 12. The match response may be a UE radio capability match response. Thus, the radio network node 12 may use the capability indication to calculate a match result, transmit the match result, optionally also including the capability indication, to the network node 13 in a match response, wherein the match result indicates a voice support capability of the UE 10.

Figure 7:
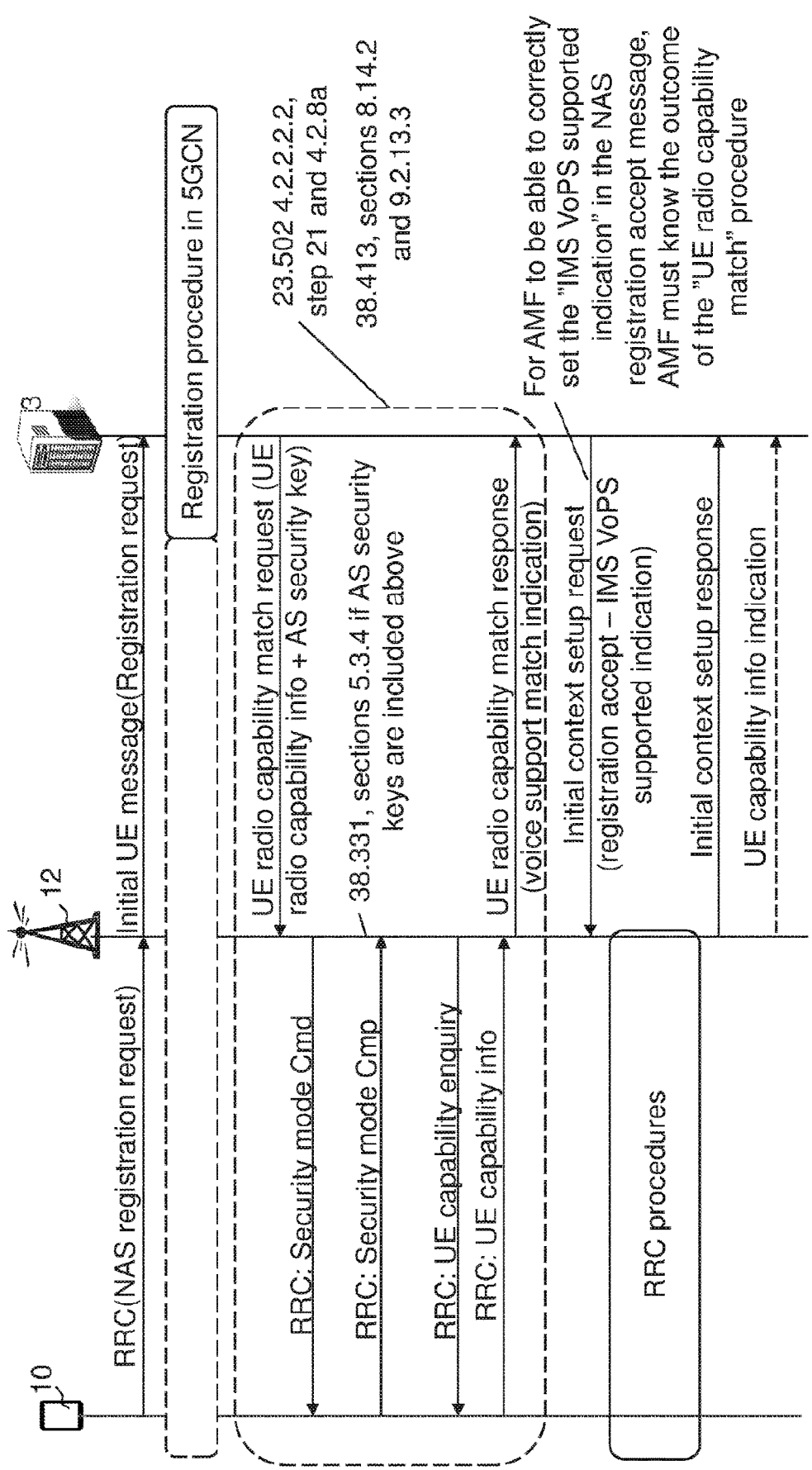
FIG. 7 is a combined flowchart and signalling scheme according to embodiments herein.

FIG. 7 is a combined flowchart and signalling scheme according to some embodiments herein.

The UE 10 performs the three-way signalling of the RRC connection procedure to request network service e.g. to convey a NAS registration request to the NG-RAN and the NG-RAN sends an initial UE message to convey the NAS registration request to the network node 13 such as an AMF node.

A following registration procedure e.g. in 5CN is then performed.

The AMF node uses standardized means to establish NAS security with the UE and then uses a successful result to derive AS security keys and AS security algorithms.

The AMF node transmits, according to embodiments herein, a UE radio capability match request to the NG-RAN, such as the radio network node 12, comprising the security indication such as AS security keys.

The NG-RAN transmits RRC security mode command (cmd) and receives a RRC security mode complete (cmp) from the UE 10.

Then the NG-RAN may then retrieve a UE capability indication by sending a UE capability enquiry to the UE 10 and receive a UE capability information from the UE 10.

The NG-RAN further transmits to the AMF node a UE radio capability match response with e.g. a voice support match indicator i.e. a voice match response from the radio network node 12 indicating whether voice over packet switched is supported or not by the UE 10 and/or the radio network node 12.

The AMF node transmits an initial context setup request to the NG-RAN, e.g. to convey a NAS registration accept with an IMS VoPS supported indication. The NG-RAN use RRC DL Information Transfer to convey the NAS registration accept message to the UE. For the AMF node to be able to correctly set the IMS VoPS supported indication in the NAS registration accept message, the AMF node uses the outcome of the UE radio capability match procedure.

RRC procedures are performed.

The NG RAN transmits an initial context setup response to the AMF node.

The NG-RAN may transmit a UE capability info indication to the AMF node.

Hence, when the network node 13, such as the AMF node, is not able to provide UE Radio Capability information, the network node 13 ensures that part of e.g. the Registration Procedure in 5CN is such that NAS security is established. The reason for that NAS security may be to establish NAS security in advance as AS security comes from the definition of security key hierarchy, see 3GPP documents TS 33.501 section 6.2.1 rel-15 and TS 33.401 section 6.2 rel-15.

A common scenario of NAS security establishment is when both UE 10 and the network node 13 are already provided with an active security context. In that case there is no need to perform the authentication procedure but rather just take the existing current security context into use e.g. ("which may include") to perform the NAS Security Mode Control procedure.

A scenario is that the network node 13 first performs the authentication procedure and, when concluded successfully, take the resulting new NAS security context into use by performing the NAS Security Mode Control (SMC) procedure.

The network node 13 may thus include either the 'UE Radio Capability information' or the 'AS Security keys' in the UE Radio Capability Match request message from the network node 13 to the radio network node 12.

The procedure may be extended with additional information element to conditionally include the 'AS Security keys'. UE Radio Capability information may be included as done presently.

Below is an example of implementing embodiments herein see underlined information elements (IE) for including the security indication.

2.13.2 UE Radio Capability Check Request

This message is sent by the AMF to request the NG-RAN node to check the compatibility between the UE radio capabilities and network configuration on IMS voice.
Direction: AMF→NG-RAN Node request message comprises the security indication, and wherein the security indication indicates data for setting up a secure connection to the UE 10. The security indication may comprise one or more security keys and/or UE Security Capability, and the request message may be a UE Capability check request message. The security indication may be piggybacked to the request message.

The network node 13 may comprise a receiving unit 803, e.g. a receiver or transceiver. The network node 13, the processing circuitry 801, and/or the receiving unit 803 may be configured to receive from the radio network node 12 the capability indication for the UE 10 in the match response, wherein the capability indication indicates the capability of the UE 10, e.g. UE Radio Capability.

The network node 13 further comprises a memory 804. The memory comprises one or more units to be used to store data on, such as indications, voice support, messages, security indications, applications to perform the methods disclosed herein when being executed, and similar. The network node 13 may comprise a communication interface comprising e.g. a receiver, a transmitter, and/or a transceiver.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| UE Radio Capability | O | | 9.3.1.74 | | YES | ignore |
| UE Security Capabilities | C-if no UE Radio Capability | | 9.3.1.86 | | YES | ignore |
| Security Key | C-if no UE Radio Capability | | 9.3.1.87 | | YES | ignore |

As an alternative; a new procedure may be added to the NGAP protocol with the sole purpose of providing the AS Security context to the RAN. A second alternative is to add parameters for the AS Security context to the NGAP Downlink NAS Transport used with signalling of the NAS Security Mode Command procedure.

Embodiments herein may: improve the security of signalling before the Initial UE Context Setup procedure, by enabling RAN to request UE Radio capability information over AS in a protected mode; and may provide an opportunity to reduce the amount of signalling and latency until the UE registration is correctly completed compared to a solution option with a use of existing standard assigning the UE with a guessed value for an IMS Voice indication, and if incorrect, use additional signalling to correct it after a later execution of the match procedure.

Figure 8:
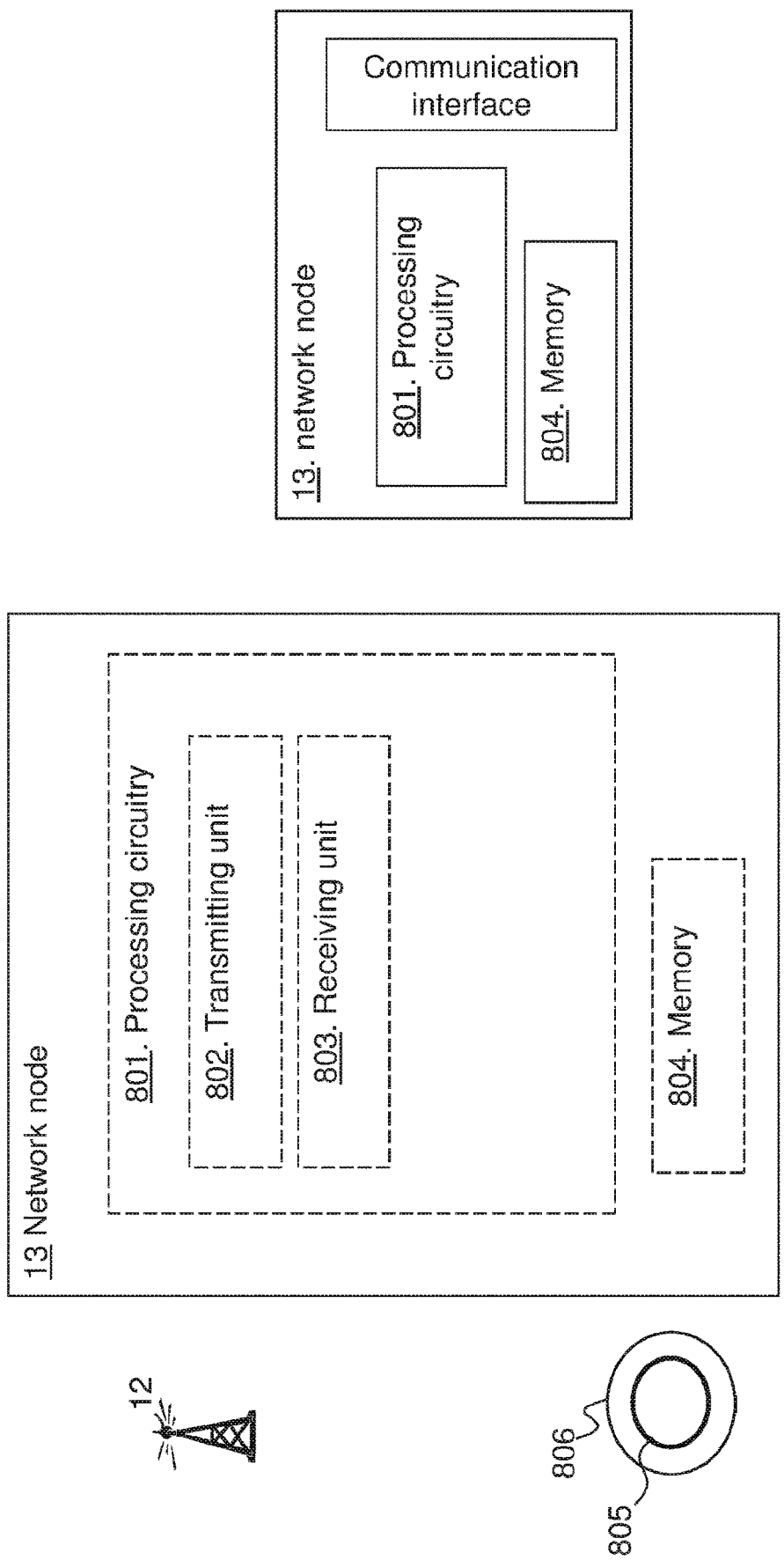
FIG. 8 is a block diagram depicting a network node according to embodiments herein.

FIG. 8 is a block diagram depicting the network node 13 for handling communication of the UE 10 in the wireless communication network 1 according to embodiments herein.

The network node 13 may comprise processing circuitry 801, such as one or more processors, configured to perform methods herein.

The network node 13 may comprise a transmitting unit 802, e.g. a transmitter or transceiver. The network node 13, the processing circuitry 801, and/or the transmitting unit 802 is configured to transmit to the radio network node 12 associated with the UE 10, the request message indicating the request for capability data for the UE 10, wherein the The methods according to the embodiments described herein for the network node 13 are respectively implemented by means of e.g. a computer program product 805 or a computer program, comprising instructions, i.e., software code portions, which, when executed on at least one processor, cause the at least one processor to carry out the actions described herein, as performed by the network node 13. The computer program product 805 may be stored on a computer-readable storage medium 806, e.g. a disc, a universal serial bus (USB) stick or similar. The computer-readable storage medium 806, having stored thereon the computer program product, may comprise the instructions which, when executed on at least one processor, cause the at least one processor to carry out the actions described herein, as performed by the network node 13. In some embodiments, the computer-readable storage medium may be a transitory or a non-transitory computer-readable storage medium.

Figure 9:
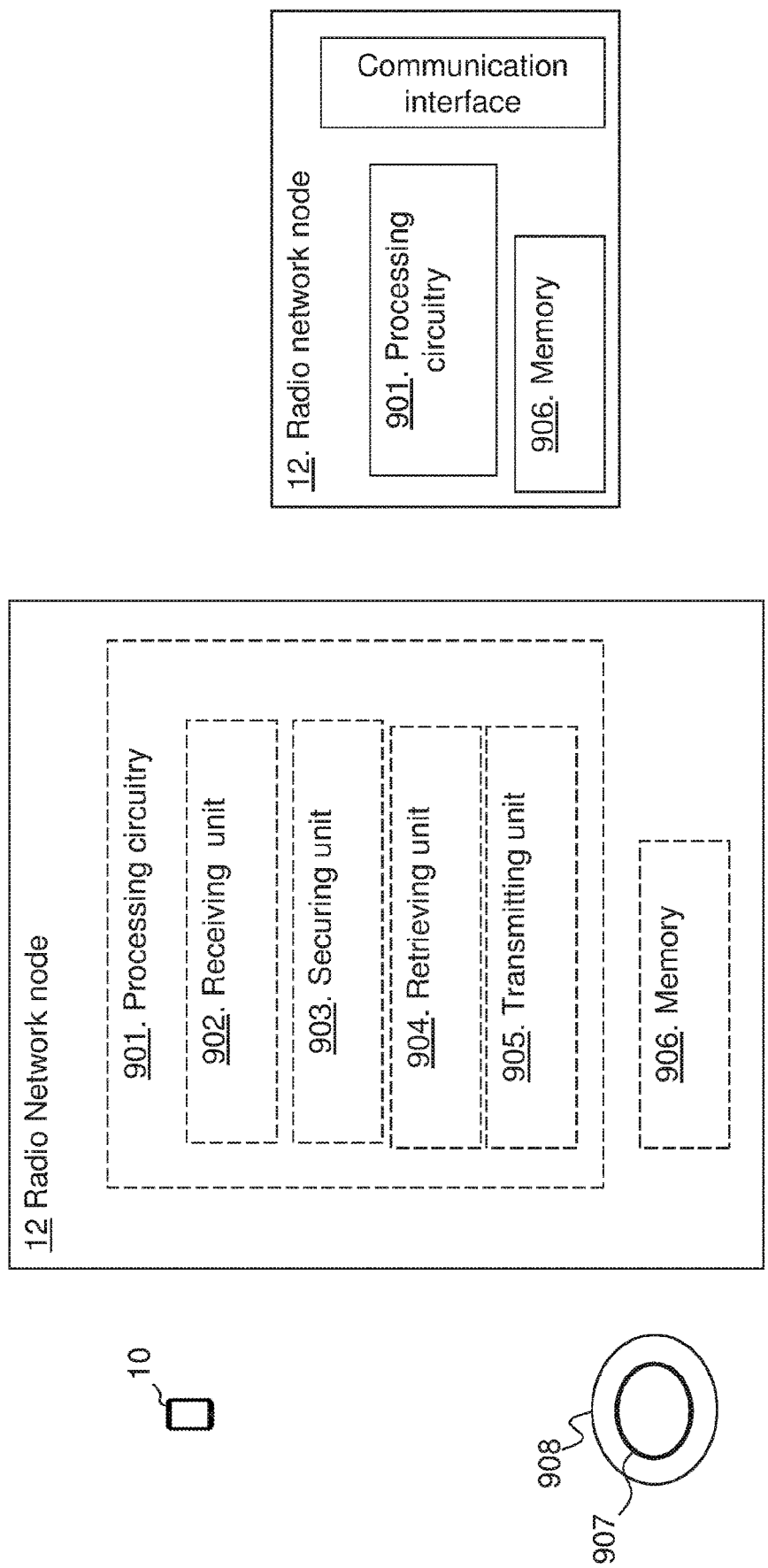
FIG. 9 is a block diagram depicting a radio network node according to embodiments herein.

FIG. 9 is a block diagram depicting the radio network node 12 for handling communication of the UE 10 in the wireless communication network 1 according to embodiments herein.

The radio network node 12 may comprise processing circuitry 901, e.g. one or more processors, configured to perform the methods herein.

The radio network node 12 may comprise a receiving unit 902, e.g. receiver or transceiver. The radio network node 12, the processing circuitry 901, and/or the receiving unit 902 is configured to receive from the network node 13 the request message indicating the request for capability data for the UE 10, wherein the request message comprises the security indication, and wherein the security indication indicates data for setting up a secure connection to the UE. The security indication may comprise one or more security keys and/or UE Security Capability, and the request message may be a UE Capability check request message. The security indication may be piggybacked to the request message.

The radio network node 12 may comprise a securing unit 903. The radio network node 12, the processing circuitry 901, and/or the securing unit 903 is configured to set up the secure connection to the UE 10 using the security indication.

The radio network node 12 may comprise a retrieving unit 904. The radio network node 12, the processing circuitry 901, and/or the retrieving unit 904 may be configured to retrieve the capability indication from the UE 10 over the secured connection, wherein the capability indication indicates the capability of the UE 10.

The radio network node 12 may comprise a transmitting unit 905. The radio network node 12, the processing circuitry 901, and/or the transmitting unit 905 may be configured to transmit the capability indication to the network node 13 in the match response, wherein the capability indication indicates capability of the UE 10.

The radio network node 12 further comprises a memory 906. The memory comprises one or more units to be used to store data on, such as indications, UE capability, voice over packet switched support indications, security indications, applications to perform the methods disclosed herein when being executed, and similar. The radio network node 12 may comprise a communication interface comprising e.g. a receiver, a transmitter, a transceiver and/or one or more antennas.

The methods according to the embodiments described herein for the radio network node 12 are respectively implemented by means of e.g. a computer program product 907 or a computer program, comprising instructions, i.e., software code portions, which, when executed on at least one processor, cause the at least one processor to carry out the actions described herein, as performed by the radio network node 12. The computer program product 907 may be stored on a computer-readable storage medium 908, e.g. a disc, a universal serial bus (USB) stick or similar. The computer-readable storage medium 908, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Figure 10:
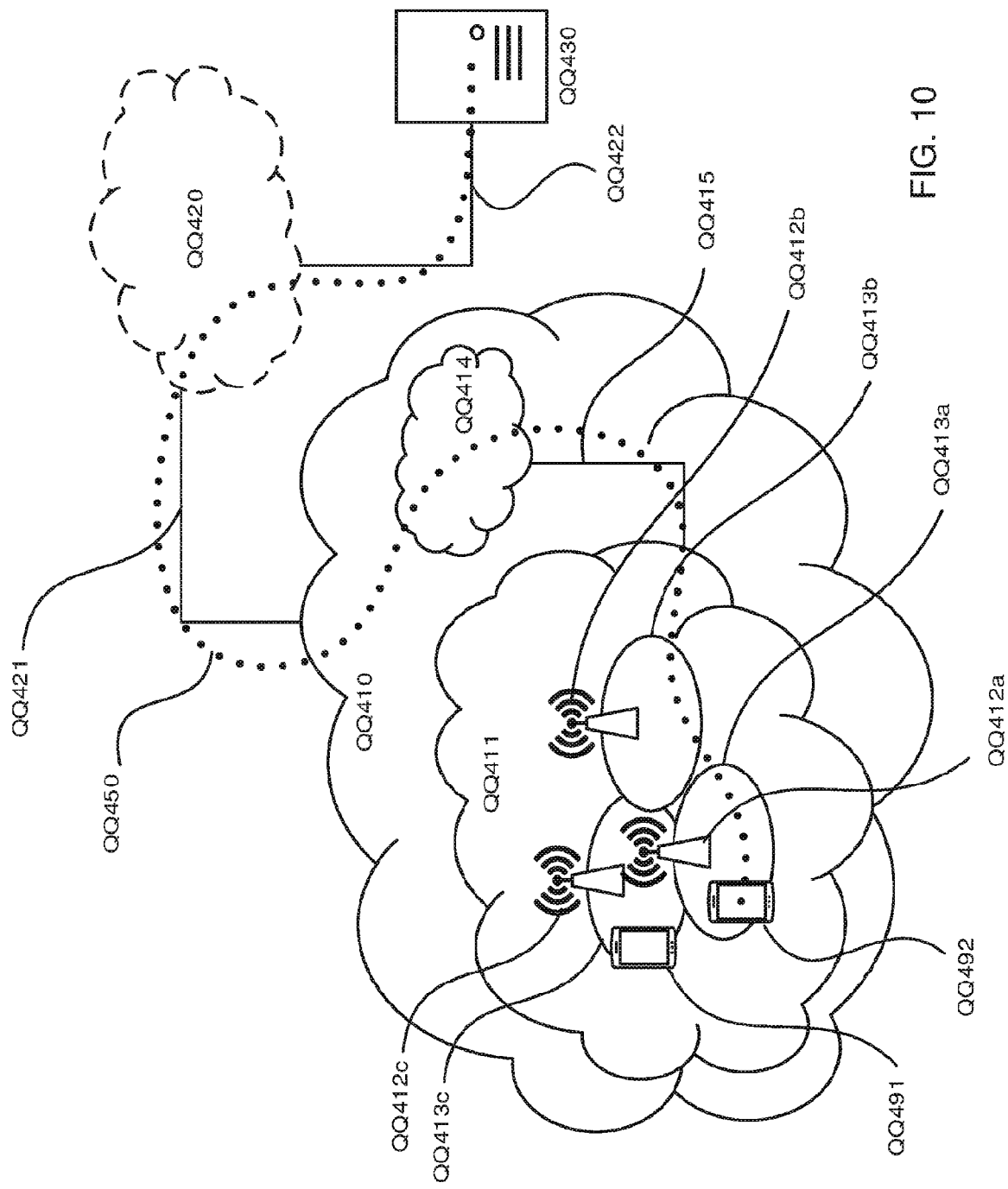
FIG. 10 shows a telecommunication network connected via an intermediate network to a host computer in accordance with some embodiments.

FIG. 10: Telecommunication network connected via an intermediate network to a host computer in accordance with some embodiments With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points being examples of the radio network node 12 above, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example being examples of the wireless device 10 above, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 11:
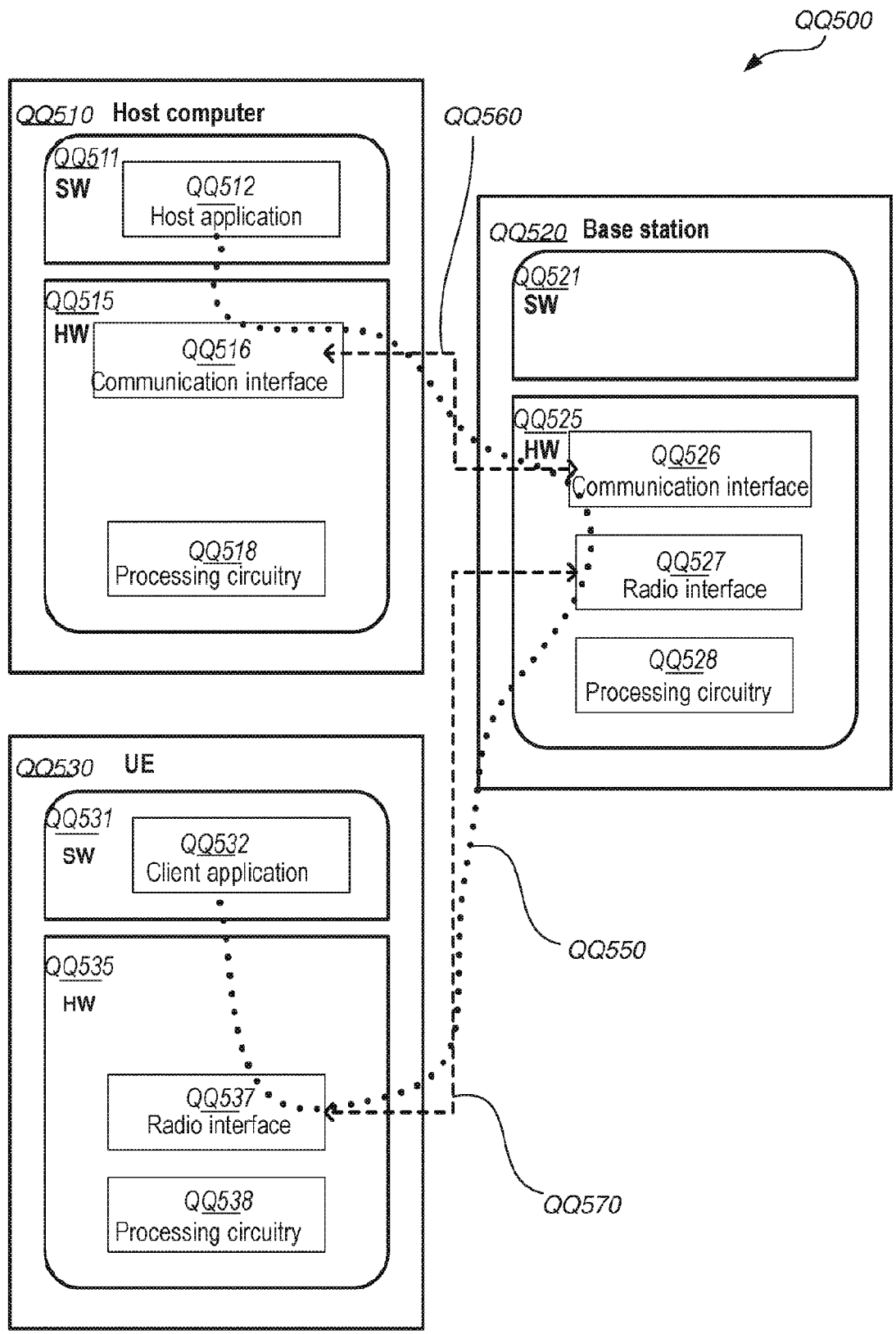
FIG. 11 shows a host computer communicating via a base station with a user equipment over a partially wireless connection in accordance with some embodiments.

FIG. 11: Host computer communicating via a base station with a user equipment over a partially wireless connection in accordance with some embodiments Example implementations, in accordance with an embodiment, of the UE, base station and host computer discussed in the preceding paragraphs will now be described with reference to Figure QQ5. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. It's hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency since security is improved towards the UE and match is more reliable and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signalling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
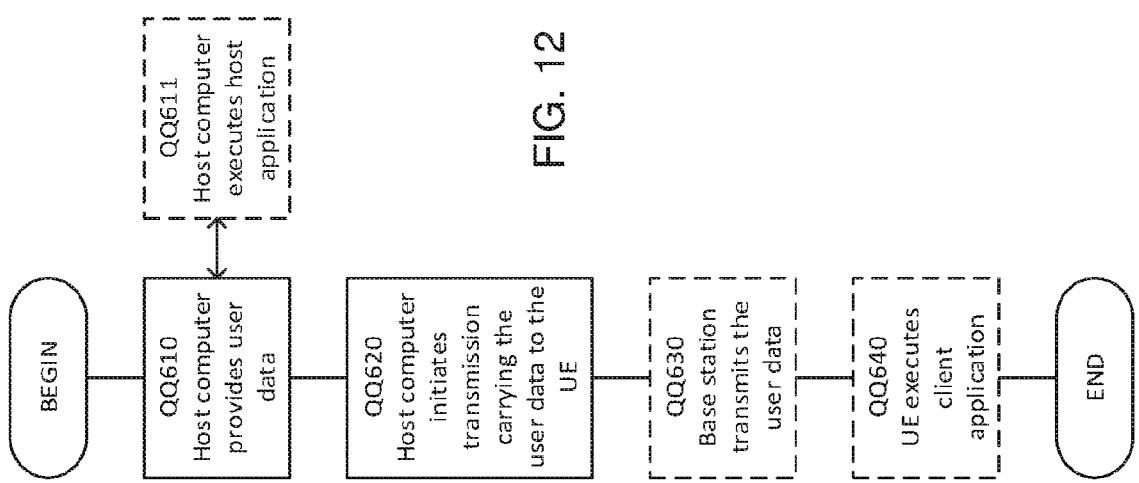
FIG. 12 shows methods implemented in a communication system including a host computer, a base station and a user equipment in accordance with some embodiments.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
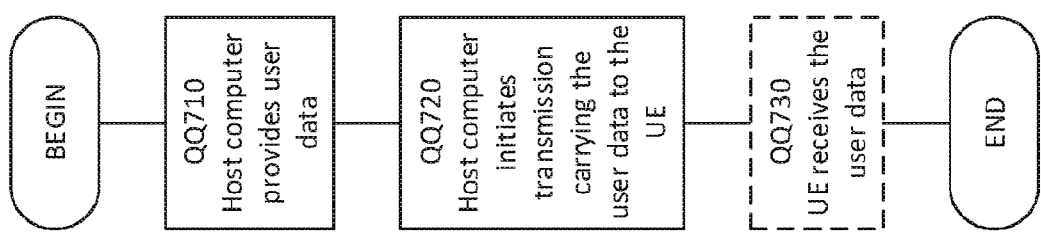
FIG. 13 shows methods implemented in a communication system including a host computer, a base station and a user equipment in accordance with some embodiments.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
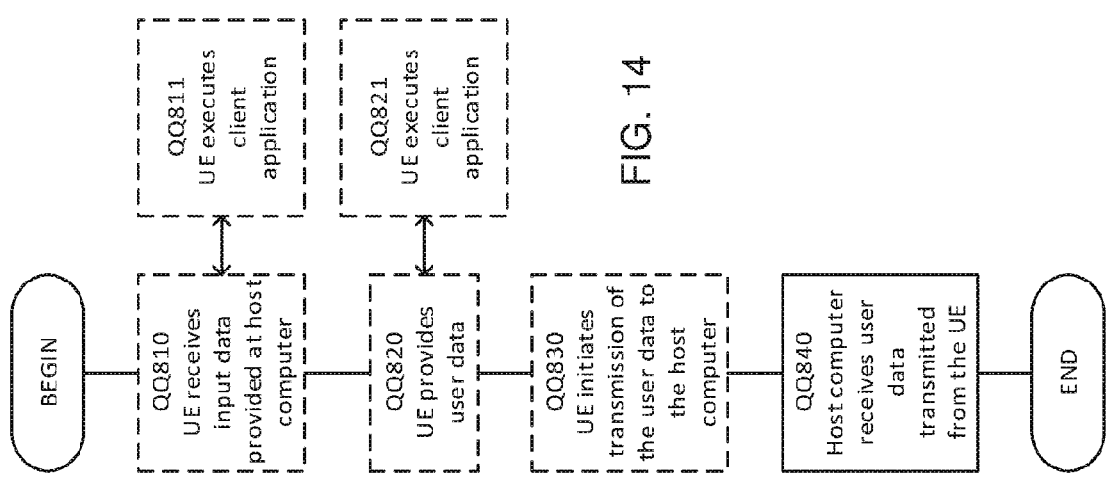
FIG. 14 shows methods implemented in a communication system including a host computer, a base station and a user equipment in accordance with some embodiments.

FIG. 14: Methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 15:
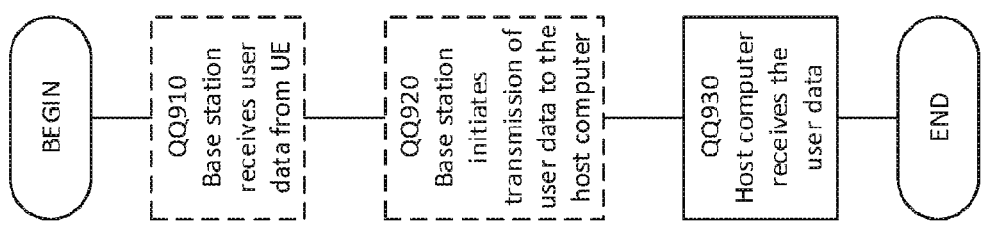
FIG. 15 shows methods implemented in a communication system including a host computer, a base station and a user equipment in accordance with some embodiments.

FIG. 15: Methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node or UE, for example.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for handling a communication of a user equipment, UE, in a wireless communication network, the method comprising:
    transmitting, to a radio network node associated with the UE, a request message indicating a request for capability data for the UE,
    wherein the request message comprises a security indication, wherein the security indication indicates data for setting up a secure connection to the UE,
    wherein the request message is a match request requesting a response indicating whether voice over packet switched communication is supported by the UE or the radio network node; and
    receiving, from the radio network node associated with the UE, a UE capability match response having a voice support match indicator indicating whether or not the voice over packet switched communication is supported by the UE;
    wherein the security indication comprises one or more security keys and/or a UE Security Capability, and wherein the request message is a UE Capability check request message.

2. The method according to claim 1, wherein the security indication is piggybacked to the request message.

3. A method performed by a radio network node for handling a communication of a user equipment, UE, in a wireless communication network, the method comprising:
    receiving, from a network node, a request message indicating a request for capability data for the UE, wherein the request message comprises a security indication, wherein the security indication indicates data for setting up a secure connection to the UE, and wherein the request message is a match request requesting a response indicating whether voice over packet switched communication is supported by the UE or the radio network node;
    transmitting a radio resource control (RRC) security mode command to the UE;
    receiving an RRC security mode complete from the UE;
    transmitting, from the radio network node to the UE, a capability inquiry requesting the response whether the voice over packet switched communication is supported by the UE;
    receiving UE capability data indicating whether the voice over packet switched communication is supported by the UE; and
    transmitting, to the network node, a UE radio capability match response indicating having a voice support match indicator indicating whether or not the voice over packet switched communication is supported by the UE;
    wherein the security indication comprises one or more security keys and/or a UE Security Capability and wherein the request message is a UE Capability check request message.

4. The method according to claim 3, wherein the security indication is piggybacked to the request message.

5. A network node for handling a communication of a user equipment, UE, in a wireless communication network, wherein the network node is configured to:
    transmit, to a radio network node associated with the UE, a request message indicating a request for capability data for the UE,
    wherein the request message comprises a security indication, wherein the security indication indicates data for setting up a secure connection to the UE, and wherein the request message is a match request requesting a response indicating whether voice over packet switched communication is supported by the UE or the radio network node; and
    receive, from the radio network node associated with the UE, a UE capability match response having a voice support match indicator indicating whether or not the voice over packet switched communication is supported by the UE;
    wherein the security indication comprises one or more security keys and/or a UE Security Capability, and wherein the request message is a UE Capability check request message.

6. The network node according to claim 5, wherein the security indication is piggybacked to the request message.

7. A radio network node for handling a communication of a user equipment, UE, in a wireless communication network, wherein the radio network node comprises processing circuitry configured to cause the radio network node to:
    receive, from a network node, a request message indicating a request for capability data for the UE,
        wherein the request message comprises a security indication, wherein the security indication indicates data for setting up a secure connection to the UE, and
        wherein the request message is a match request requesting a response indicating whether voice over packet switched communication is supported by the UE or the radio network node;
    transmit a radio resource control (RRC) security mode command to the UE;
    receive an RRC security mode complete from the UE;
    transmit, from the radio network node to the UE, a capability inquiry requesting the response whether the voice over packet switched communication is supported by the UE;

receive UE capability data indicating whether the voice over packet switched communication is supported by the UE; and transmit, to the network node, a UE radio capability match response indicating having a voice support match indicator indicating whether or not the voice over packet switched communication is supported by the UE;

wherein the security indication comprises one or more security keys and/or a UE Security Capability, and wherein the request message is a UE Capability check request message.

* * * * *